United States Patent
Barkman et al.

(10) Patent No.: US 8,610,393 B2
(45) Date of Patent: Dec. 17, 2013

(54) METHOD AND APPARATUS FOR CHARACTERIZING AND ENHANCING THE DYNAMIC PERFORMANCE OF MACHINE TOOLS

(75) Inventors: William E. Barkman, Oak Ridge, TN (US); Edwin F. Babelay, Jr., Knoxville, TN (US)

(73) Assignee: Babcock & Wilcox Technical Services Y-12, LLC, Oak Ridge, TN (US)

( * ) Notice: Subject to any disclaimer, the term of this patent is extended or adjusted under 35 U.S.C. 154(b) by 463 days.

(21) Appl. No.: 12/760,115

(22) Filed: Apr. 14, 2010

(65) Prior Publication Data

US 2011/0254495 A1 Oct. 20, 2011

(51) Int. Cl.
*G05B 13/04* (2006.01)

(52) U.S. Cl.
USPC .......................................... 318/561; 318/575

(58) Field of Classification Search
USPC ........................... 318/490, 560, 561, 565, 575
See application file for complete search history.

(56) References Cited

U.S. PATENT DOCUMENTS

| | | | |
|---|---|---|---|
| 3,487,749 A * | 1/1970 | Bschorer | 409/79 |
| 3,569,682 A * | 3/1971 | Tipton et al. | 318/565 |
| 3,602,090 A * | 8/1971 | Whetham | 409/239 |
| 3,667,290 A * | 6/1972 | Hohn | 73/862.191 |
| 3,699,317 A | 10/1972 | Middleditch | |
| 3,752,968 A | 8/1973 | Pilafidis et al. | |
| 3,777,125 A | 12/1973 | Whetham | |
| 3,860,862 A * | 1/1975 | Dell et al. | 318/568.1 |
| 3,945,297 A | 3/1976 | Hohberger | |
| 4,027,245 A | 5/1977 | Bourrat et al. | |
| 4,348,623 A | 9/1982 | Kobayashi et al. | |
| 4,428,055 A | 1/1984 | Kelley et al. | |
| 4,698,773 A * | 10/1987 | Jeppsson | 700/160 |
| 4,707,793 A | 11/1987 | Anderson | |
| 4,866,360 A | 9/1989 | Kolomeets et al. | |
| 4,992,711 A * | 2/1991 | Sugita et al. | 318/561 |
| 5,679,053 A | 10/1997 | Sakakura et al. | |
| 5,815,400 A | 9/1998 | Hirai et al. | |
| 6,012,446 A | 1/2000 | Ebbeson | |

(Continued)

FOREIGN PATENT DOCUMENTS

EP 0762248 A1 3/1997

OTHER PUBLICATIONS

Kwon, H.D., et al: "Development and Application of a System for Evaluating the Feed-Drive Errors on Computer Numerically Controlled Machine Tools"; Precision Engineering, vol. 19 No. 2/3, Oct./Nov. 1996, pp. 133-140.

(Continued)

*Primary Examiner* — Bentsu Ro
(74) *Attorney, Agent, or Firm* — Michael J. Renner, Esq.; Luedeka Neely Group, P.C.

(57) ABSTRACT

Disclosed are various systems and methods for assessing and improving the capability of a machine tool. The disclosure applies to machine tools having at least one slide configured to move along a motion axis. Various patterns of dynamic excitation commands are employed to drive the one or more slides, typically involving repetitive short distance displacements. A quantification of a measurable merit of machine tool response to the one or more patterns of dynamic excitation commands is typically derived for the machine tool. Examples of measurable merits of machine tool performance include dynamic one axis positional accuracy of the machine tool, dynamic cross-axis stability of the machine tool, and dynamic multi-axis positional accuracy of the machine tool.

8 Claims, 6 Drawing Sheets

(56) References Cited

U.S. PATENT DOCUMENTS

| | | | |
|---|---|---|---|
| 6,270,297 | B1 | 8/2001 | Fang et al. |
| 6,341,996 | B1 | 1/2002 | Brien et al. |
| 6,409,573 | B1 | 6/2002 | Mukai et al. |
| 6,909,517 | B2 | 6/2005 | Coleman et al. |
| 6,912,446 | B2 | 6/2005 | Wang et al. |
| 6,973,738 | B2 | 12/2005 | Kaneda et al. |
| 6,993,410 | B2 * | 1/2006 | Esterling .................. 700/177 |
| 7,234,128 | B2 | 6/2007 | Gau et al. |
| 7,341,410 | B2 | 3/2008 | Hill et al. |
| 7,659,682 | B2 | 2/2010 | Matsumoto et al. |
| 7,933,677 | B2 | 4/2011 | Lankalapalli et al. |
| 8,024,068 | B2 | 9/2011 | Gray |
| 8,240,234 | B2 | 8/2012 | Woody et al. |
| 2004/0236529 | A1 | 11/2004 | Esterling |
| 2005/0021265 | A1* | 1/2005 | Esterling .................. 702/76 |
| 2006/0243107 | A1 | 11/2006 | Mann et al. |
| 2009/0107308 | A1 | 4/2009 | Woody et al. |

OTHER PUBLICATIONS

Ren, X.D. et al: "A New Calibration Method for Parallel Kinematics Machine Tools Using Orientation Constraint", International Journal of Machine Tools and Manufacture, Elsevier, US, vol. 49, No. 9, Jul. 1, 2009, pp. 708-721, XP026127730, ISSN: 0890-6955, DOI: 10.1016/J. IJMACHTOOLS.2009.03.004 [retrieved on Mar. 27, 2009].

Iwai, H. et al: "Development of a Measuring Method for Motion Accuracy of NC Machine Tools Using Links and Rotary Encoders", International Journal of Machine Tools and Manufacture, Elsevier, US, vol. 49, No. 1, Jan. 1, 2009, pp. 99-108, XP025654989, ISSN: 10.1016/J.IJMACHTOOLS.2008.06.011 [retrieved on 1008-07-02].

Ren, X.D. et al: "Self-Calibration of Parallel Manipulators Using and Orientation Constraint", Industrial Electronics and Applications, 2009. ICIEA 2009. 4th IEEE Conference on, IEEE, Piscataway, NJ, USA, May 25, 2009, pp. 2841-2844, XP031482555, ISSN: 978-1-4244-5799-4.

Dagalakis, Nicholas G., et al: "Kinematic Modeling of a 6 Degree of Freedon Tri-Stage Micro-Positioner", American Society for Precision Engineering 16th Annual Meeting, pp. 200-203, Nov. 10-15, 2001, Crystal City, Virginia.

Brochure: "Performance Measurement and Calibration Systems", RENISHAW: apply innovation, pp. 1-48, printed in England 0307 (v7) L-8003-2424, Jan. 2002.

T. Ozel et al., "Predictive modeling of surface roughness and tool wear in hard turning using regression and neural networks", International Journal of Machine Tools and Manufacture, Elsevier, vol. 45, No. 4-5, pp. 467-479 (Apr. 1, 2005).

* cited by examiner

3D PLOT OF SURFACE TEXTURE VALUES CORRESPONDING TO A RANGE OF OPR AND OSCILLATION AMPLITUDES. 0.031 INCH TOOL NOSE RADIUS AND 0.003 INCH FEED PER REVOLUTION.

METHOD AND APPARATUS FOR CHARACTERIZING AND ENHANCING THE DYNAMIC PERFORMANCE OF MACHINE TOOLS

GOVERNMENT RIGHTS

The U.S. Government has rights to this invention pursuant to contract number DE-AC05-00OR22800 between the U.S. Department of Energy and Babcock & Wilcox Technical Services Y-12, LLC.

FIELD

This disclosure relates to the field of characterizing and enhancing the performance of numerically controlled machine tools such as milling machines, grinding machines, and turning machines. More particularly, this disclosure relates to the dynamic performance of numerically controlled machine tools in applications with a requirement for precise positioning operations between an object being machined or measured and a cutting tool, grinding wheel, or inspection probe.

BACKGROUND

Machine tools are designed to produce movement of an object to be machined or inspected and/or a cutting tool (or grinding wheel) along at least one axis of motion, and typically three or more axes. For example, a "3-axis milling machine" typically moves any object to be machined along two orthogonal horizontal axes ("X" and "Y") and moves a cutting tool spindle along a vertical third axis ("Z") that is orthogonal to X and Y. A 4 or 5-axis milling machine adds one or two (respectively) rotary axes. An "A" axis provides a tilt angle around the X axis, a "B" axis provides a tilt angle around the Y axis, and a "C" axis provides a rotation around the Z axis. Each A, B, and C axis is orthogonal to the other two tilt axes. While three tilt axes could be added to a three axis milling machine to make a 6-axis milling machine, many machining jobs only require 5 axes of motion, so that is a common configuration. Additional motion axes may be added by providing axes that are parallel to each other but offset by a linear displacement. With the addition of such further axes, typical machine configurations are characterized as 7-axis machines and 9-axis machines. In addition, dimensional inspection machines closely resemble metal-removal machines except that the cutting tool (or grinding wheel) is replaced with a measurement probe.

Almost all turning machines (e.g., lathes and boring machines) provide at least two axes of relative motion between an object to be turned and a cutting tool. The "X" axis provides movement of the tool carriage perpendicular to the spindle (horizontally across the bed). An orthogonal "Y" axis provides vertical movement of a tool toward and away from the bed. An orthogonal "Z" axis provides movement of the carriage toward or away from the spindle chuck. Each of the X, Y and Z axes of a turning machine are orthogonal to the other two axes. Additional tool path and/or object motion axes may be provided by tilt axes A, B, and C. Lathe and boring machine tilt axes conform to the same standard as that for milling machines: The A axis provides a rotation around the X axis, the B axis provides rotation around the Y axis, and the C axis provides rotation around the Z axis.

Precision machining operations require accurate positioning of a cutting tool with respect to an object being machined. Existing machine tool performance analysis techniques are typically based upon position measurements along the X, Y, Z, A, B, or C axes that are taken under static or slowly moving operational conditions. While such tests may provide a useful assessment of some aspects of a machine tool's geometry errors, machine tools typically operate in modes where either the object being machined and/or the cutting tool move in rapid dynamic patterns. The term "dynamic" as used herein refers to conditions associated with relative acceleration and deceleration between two or more objects. The rapid dynamic patterns of motion are generated by a computer program, referred to herein as a "part program," irrespective as to whether it is the object being machined that is being moved or the cutting tool that is being moved. The part program generates dynamic excitation commands that are provided to a machine tool's motion control system. The term "dynamic excitation commands" refers to motion commands that have an acceleration and/or a deceleration component. The motion controller is a programmable device and may be a microprocessor, a programmable logic controller, or a computer. The motion control system generates command signals that are amplified to drive motors that move various components of the machine tool.

Most existing machine tool performance analysis techniques do not detect the errors associated with a machine's dynamic characteristics, which are especially important in applications that approach the velocity and acceleration limits of a machine's servo system capabilities or when errors may be introduced by limits in the dynamic stiffness of a machine tool's structural frame. What are needed therefore are better methods to assess the accuracy and performance characteristics of machine tools under dynamic operational conditions.

SUMMARY

The present disclosure provides a method for assessing the dynamic performance of a machine tool having a first axis slide that has a first motion axis. The method includes the step of electronically instructing the machine tool to drive the first axis slide along the first axis using a first pattern of dynamic excitation commands that include displacements less than about one-half inch, to generate a first machine-tool-response. The method further includes the step of deriving a first quantification of a measurable merit of machine tool response from the first machine-tool-response to the first pattern of dynamic excitation commands.

Also disclosed herein is a method for assessing a dynamic two axis positional accuracy of a machine tool having a first axis slide having a first motion axis and having a second axis slide having a second motion axis that is perpendicular to the first motion axis. The method involves electronically instructing the machine tool to drive the first axis slide along the first motion axis using a first pattern of dynamic excitation commands while further electronically instructing the machine tool to drive the second axis slide in a second pattern of dynamic excitation commands along the second motion axis. As the slides are being driven, the first actual motion of the first axis slide along the first motion axis and a second actual motion of the second axis slide along the second motion axis are measured. The method further includes the step of evaluating the dynamic two axis positional accuracy of the machine tool. This technique may also be applied to machines with more than two axes.

BRIEF DESCRIPTION OF THE DRAWINGS

Various advantages are apparent by reference to the detailed description in conjunction with the figures, wherein.

DETAILED DESCRIPTION

Figure 1:
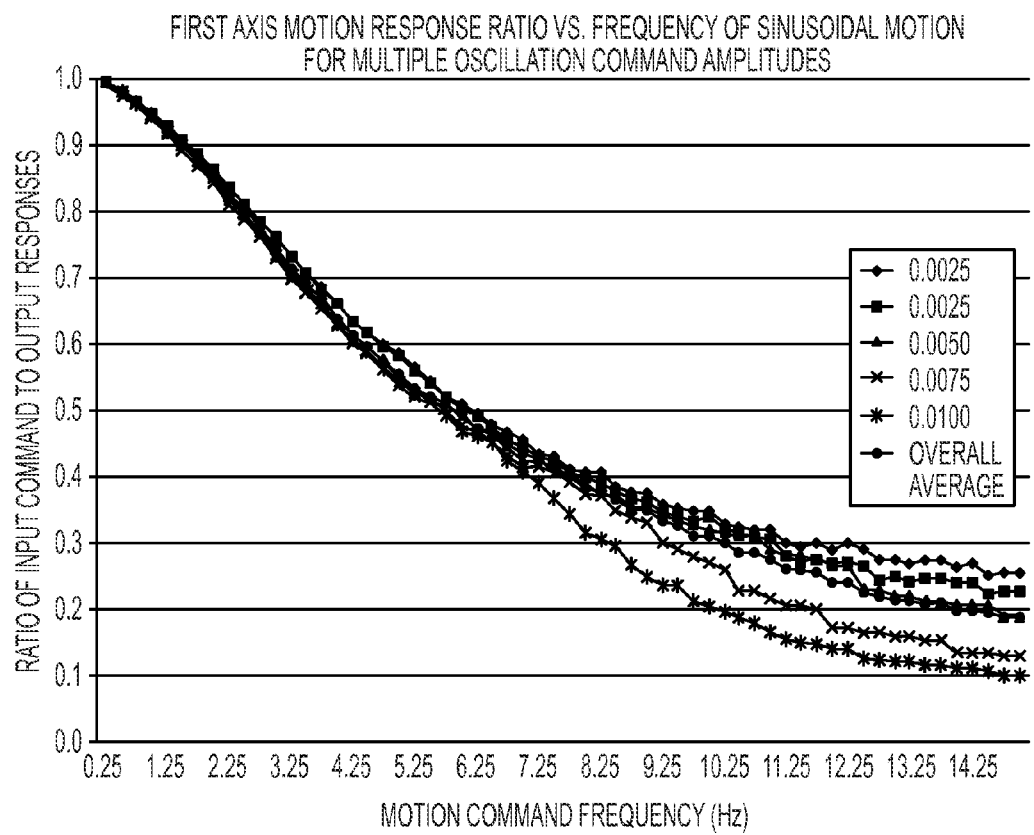
FIG. 1 illustrates a map of machine tool accuracy.

In the following detailed description of the preferred and other embodiments, reference is made to the accompanying drawings, which form a part hereof, and within which are shown by way of illustration the practice of specific embodiments of systems and methods for assessing and improving the capability of a machine tool. The following detailed description presents preferred and other embodiments of such systems and methods. It is to be understood that other embodiments may be utilized, and that structural changes may be made and processes may vary in other embodiments.

It is fairly common to assess the static or slow-moving positional accuracy and other performance characteristics of a machine tool so that error compensations may be built into the programs that drive the machine tool. However, it is often necessary to operate a machine tool in a manner that produces rapid accelerations and decelerations of the machine axes (high-speed cornering, modulated tool-path chip breaking, etc.) and the machine's ability to follow the associated dynamic motion commands has a direct impact on the quality of the workpiece. Embodiments herein are generally directed toward assessment of positional accuracy (or inaccuracies) and other performance characteristics of a machine tool under dynamic operating conditions such as rapidly changing motion vectors, or high speed translational motion conditions, or combinations of those two conditions.

Disclosed herein are methods for characterizing the dynamic performance of machine tools and using this information to enhance a machine's performance. These methods typically employ measurements using a combination of an on-machine "sensor nest" and a "cubic reference block." A sensor nest is a configuration of sensors designed to measure a machine's response to rapidly changing axes position commands. The sensor nest consists of three orthogonal position sensors that are secured within the sensor-nest framework so that they do not exhibit motion relative to each other during the machine testing cycle. The cubic reference block is a precision cube or rectangle that has high quality, flat, perpendicular surfaces that provide a position reference for the displacement sensors. Both the sensor nest and the reference block have support members that allow them to be securely attached to the machine tool being tested. Single axis dynamic performance characterization may be assessed without using a sensor nest and reference block by measuring the motion of the single axis relative to a stationary part of the machine. Alternatively, a somewhat less accurate method of determining the dynamic performance of the machine is to use the machine's axes position transducers to record the machine's response to the dynamic motion commands. The inaccuracies associated with this approach are due to the Abbé offset between the position transducers and the cutting tool or workpiece and the possibility of mechanical deflections occurring outside the position measurement loop. However, the data analysis and machine compensation techniques employed would be the same for either approach.

When used on a 3-axis machining center, jig grinder, coordinate measuring machine, or a similar device with horizontal work slides and a vertical spindle/probe axis, the cube may be attached to the vertical axis and aligned so that the faces are nominally perpendicular to the axes motions. The sensor nest is then attached to the work slide, in a position that approximates the location used for workpieces, and aligned so that the sensor axes are parallel with the machine axes. Then the machine axes are moved so that the cube is positioned within the sensor nest and the sensors are pointed toward the center of the cube. This means that the individual orthogonal sensors only detect motion that is parallel with the sensor axis; the motion perpendicular to the sensor axis causes the sensor measurement point to traverse across the cube face and does not produce a displacement signal. A similar approach may be used with devices such as gantry machines that carry one or more vertical axes on one of the horizontal axes.

On a lathe, grinding machine, or similar device that attaches the workpiece to a rotary axis and employs stacked slides to create or measure a figure of revolution, the cubic reference block may be located on a stationary part of the machine and the sensor nest mounted on the uppermost slide. If the lathe design uses independent slides then the block may be mounted on one slide and the sensors mounted on a second orthogonal slide. Multi-axis machines may be evaluated in a similar manner by mounting the system components on the appropriate machine axes.

The part program that controls the axes motions during the testing cycle produces an oscillatory motion, such as a sinusoid or other repeating pattern, which covers a range of amplitudes and frequencies that are chosen for a particular machine's applications. The comparison of the commanded axes motions with the sensor measurements provides performance information (much like a Bode Plot) that defines the machine's dynamic performance capabilities as seen by the mechanical loop between a workpiece and a cutting tool or measurement probe. FIG. 1 illustrates a map of machine tool accuracy, showing a first axis motion response ratio version frequency of sinusoidal motion for several oscillation command amplitudes. This performance data includes the effects of the machine's servo system performance limitations and the mechanical deflections that occur outside the machine's position feedback loop.

The displacement sensors mounted in the sensor nest may be selected from a variety of contact or noncontact sensors as long as the sensors' range of travel and frequency response are within the desired range of the axes oscillations. In addition, the alignment of the sensor nest and the cube measurement artifact to the machine axes does not have to be perfect because the data collection/analysis system records the changes in the machine performance as the frequency of the oscillation commands is increased (in either incremental, "swept sine," or other modes) from a relatively slow motion to more challenging oscillations. This allows the slow speed data to be used for the correction of alignment errors, as needed.

During typical testing operations, the machine tool is electronically instructed to drive a moveable element (a slide or a spindle) through a pattern of dynamic excitation commands of displacements that are less than about one-half inch (i.e., about +/−one quarter inch). Alternately, in some embodiments, the dynamic response testing operations may use displacements as small as about +/−0.005" or less. The maximum rate of displacement of a movable element is generally dependent on the size and mass of the machine tool and the capability of the axes servo systems and the test parameters are selected based on the machine's characteristics and the intended application. These rates of displacement (axes velocities) may range from a few thousandths of an inch per second for a diamond machining application to many inches per second for a high speed milling application. In addition, while the system can accommodate step or impulse motion commands, the more common test waveform is an oscillation signal and in this case, an important test parameter is the frequency of the excitation commands. Most machine tools are incapable of responding to oscillation commands above 20 Hz; however, this is not an inherent limitation of the performance monitoring technique. The only limitations associated with this approach are the data collection rate (typically thousands of Hz on current systems) and the resonant frequency of the sensory nest and measurement cube mounting system (typically an order of magnitude or higher than the machine's servo capability.)

Figure 2:
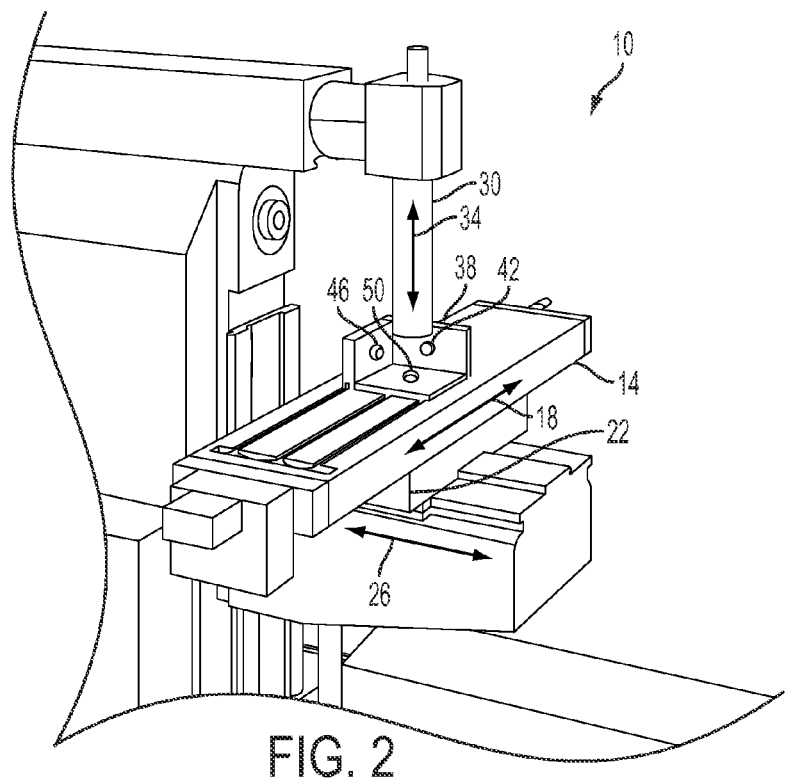
FIG. 2 is a perspective view of features of a three-axis milling machine with a sensor nest installed.

FIG. 2 illustrates portions of a three-axis milling machine 10. The three-axis milling machine 10 is a computer numerical control (CNC) machine that operates by stepper or servo motors that are driven with motor controllers under electronic instructions loaded into a programmable motion control system. The three-axis milling machine 10 has a first slide 14 that moves along an X-axis 18, a second slide 22 that moves along a Y-axis 26 and a spindle 30 that moves along a Z-axis 34. The X-axis 18, the Y-axis 26, and the Z-axis 34 are orthogonal to each other. FIG. 2 also illustrates a sample sensor nest 38 that is rigidly mounted to the first slide 14. The sensor nest 38 has a first proximity sensor 42, a second proximity sensor 46, and a third proximity sensor 50. The exact shape of the sensor nest is unimportant as long as it provides a stable platform for positioning the sensors in the correction locations/orientations.

Figure 3:
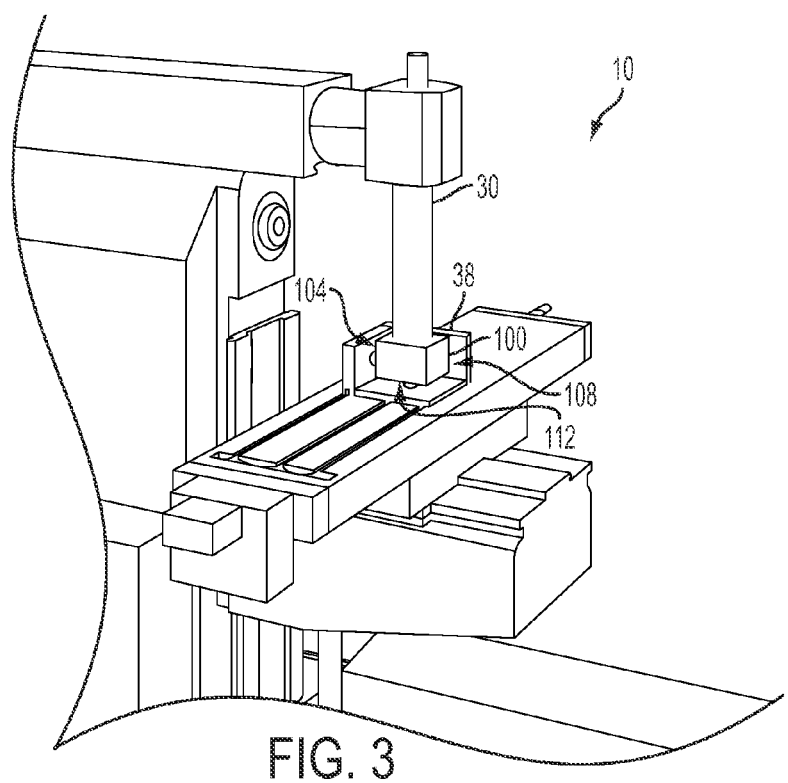
FIG. 3 is a perspective view of the three-axis milling machine and sensor nest of FIG. 1, with a cubic reference block installed.

FIG. 3 illustrates a cubic reference block 100 that is rigidly mounted on the spindle 30 of the three-axis milling machine 10. The cubic reference block 100 is an example of a "reference block" as that term is used herein and could be any appropriately-sized rectangular cuboid. The cubic reference block 100 has three orthogonal faces, 104, 108, and 112. The first face 104 is in a plane that is parallel to the X-axis 18 and the Z-axis 34, and orthogonal to the Y-axis 26 of the three-axis milling machine 10. The second face 108 is in a plane that is parallel to the Y-axis 26 and the Z-axis 34. The third face 112 is in a plane that is parallel to the X-axis 18 and the Y-axis 26 and orthogonal to the Z-axis 34.

Displacement between the sensor nest 38 and the cubic reference block 100 along the X-axis 18 is measured by the first proximity sensor 42. Displacement between the sensor nest 38 and the cubic reference block 100 along the Y-axis 26 is measured by the second proximity sensor 46. Displacement between the sensor nest 38 and the spindle 30 is detected by the third proximity sensor 50.

To test the dynamic response of the three-axis milling machine 10, a pattern of dynamic excitation commands is directed toward establishing a dynamic pattern of motion, which is generally a repetitive cyclical pattern, but may be a non-repeating "one cycle" pattern. A dynamic excitation command that establishes a repetitive cyclical pattern typically adds an oscillating motion to a basic tool path. In some embodiments, one of the three movable elements (the first slide 14, the second slide 22, and/or the spindle 30) may be held in a stationary position while the remaining movable element(s) is (are) moved in a pattern of dynamic excitation commands.

Figure 4:
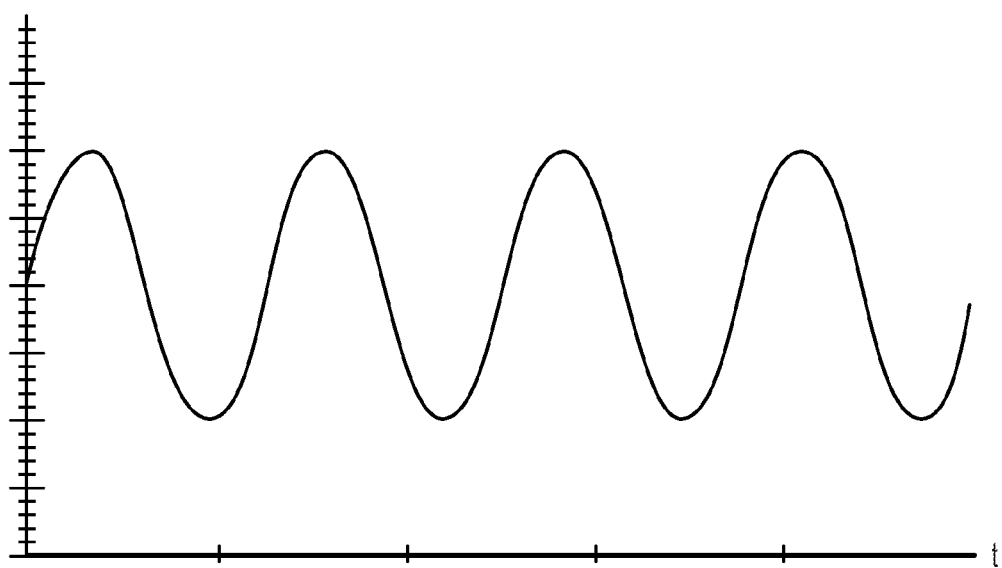
FIGS. 4 and 5 are graphs of sinusoidal dynamic patterns of motion.

FIG. 4 illustrates an example of a first sinusoidal dynamic pattern of motion. In any case, with dynamic excitation commands there is a directed change in the slope of an axis displacement vs. time curve. The rate of motion may be constant over portions of the cycle (e.g., sawtooth) or variable (e.g., sinusoidal). Changing between a first pattern of dynamic excitation commands and a second pattern of dynamic excitation commands produces a measurement of a machine's ability to respond to a range of machining conditions such as a change in cutting speed, a change in frequency, a change in oscillation amplitude, or a change in waveform.

Typically, when measuring the undesirable cross coupling between axes, the three-axis milling machine 10 is electronically instructed to move only one movable element (a "first axis slide") along a "first motion axis" while keeping the other two movable elements stationary. While the term "first axis slide" is used here, it is understood that in a three-axis milling machine the movable element may be the spindle and the term "axis slide" encompasses the spindle. In other test conditions used to evaluate a machine's ability to perform dynamic contouring motions, multiple axes or all of the axes may be moved simultaneously.

To assess the dynamic performance of a machine tool, one or more moveable elements are typically driven along their motion axis in one or more patterns of dynamic excitation, and a quantification of a measurable merit of machine tool response to the one or more patterns of dynamic excitation commands is typically derived for the machine tool. Examples of measurable merits of machine tool performance where only one axis slide is dynamically excited ("one-axis excitation") include dynamic one axis positional accuracy of the machine tool, dynamic cross-axis stability of the machine tool, workpiece surface finish, and the ability to generate chips of a desired length while performing modulated tool-path chip breaking operations. As used herein, the term "modulated tool path" refers to a tool path between (for example) points $(x_1, y_1, z_1)$ and $(x_2, y_2, z_2)$ wherein an oscillation (such as a sinusoidal oscillation) is superimposed on the basic tool path as it moves from point $(x_1, y_1, z_1)$ to point $(x_2, y_2, z_2)$. Examples of measurable merit of machine tool performance when two or more movable elements are dynamically excited ("two-axis or multi-axis excitation") include dynamic two axis positional accuracy of the machine tool, cross-coupling errors between machine elements, workpiece surface finish, and the ability to generate chips of the desired length. These terms are described in more detail subsequently herein.

Some methods of assessing the dynamic performance of a machine tool involve driving one motion axis in a pattern of short displacements using a first pattern of excitation commands, and measuring a first actual motion of the first axis slide along the first motion axis in response to the first pattern of dynamic excitation commands. Typically the proximity sensor (i.e., one of the proximity sensors 42, 46, or 50) associated with the axis or the spindle that is the movable element being tested is used to measure actual displacement of the "first axis slide" over time under the first pattern of dynamic excitation. A visual indication of machine tool performance may be provided by graphing the first pattern of dynamic excitation commands (planned displacement over time) and the first actual motion (actual displacement over time) on the same chart and visually observing the two graphs. Typically the first actual motion is quantitatively compared with the first pattern of dynamic excitation commands to establish a first quantification of the dynamic one axis positional accuracy of the machine tool. Such a quantification may be in the form of the calculation of a correction coefficient or calculation of a best-fit curve through the first actual motion position measurements. When the machine tool is configured to manufacture parts, the results of the performance test may be used to program the machine tool with modified process parameters in order to compensate for positional errors indicated by the positional accuracy measurements or to modify servo system settings to optimize the machine's response for a particular application.

Figure 5:
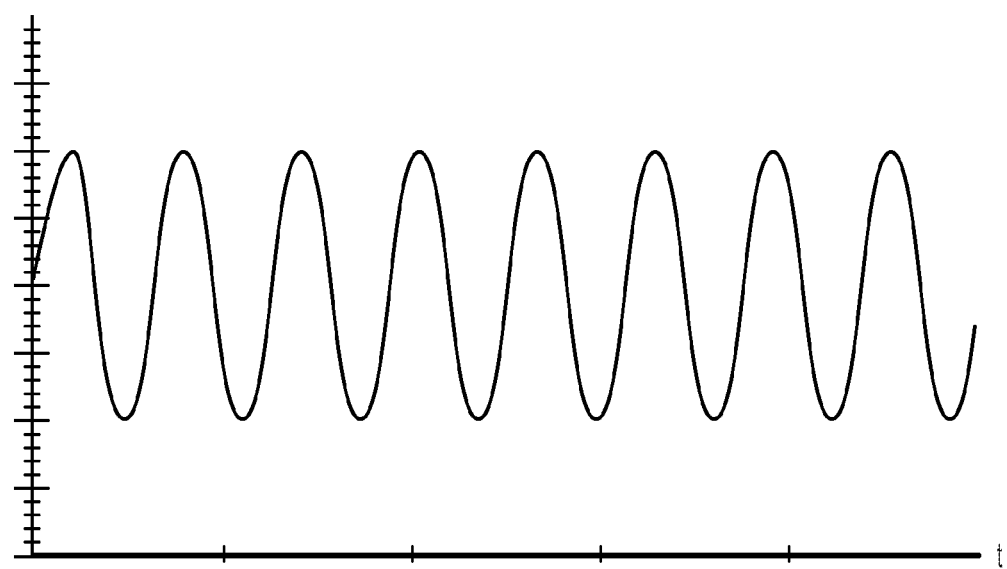

Another method of assessing the dynamic performance of a machine tool involves driving one motion axis in two patterns of short displacement excitation commands and comparing the results. For example, after driving one motion axis in a pattern of short displacements using a first pattern of excitation commands (and measuring a first actual motion of the first axis slide along the first motion axis in response to the first pattern of dynamic excitation commands) the dynamic response of a milling machine may be further evaluated by electronically instructing the machine tool to drive the first axis slide along the first motion axis using a second pattern of dynamic excitation commands comprising displacements less than about one-half inch, where the second pattern is different from the first pattern of dynamic excitation commands. FIG. 5 illustrates an example of a second sinusoidal dynamic pattern of motion. In this embodiment the second sinusoidal dynamic pattern of motion is approximately twice the frequency of the first sinusoidal dynamic pattern of motion depicted in FIG. 4. The second pattern of dynamic excitation commands generates a second machine-tool-response. A second quantification of the measurable merit of machine tool performance is then derived from the machine's response to a second pattern of dynamic excitation commands. Typically the first quantification of the measurable merit of machine tool performance is compared with the second quantification of the measurable merit of machine tool performance to assess the capability of the machine tool under different dynamic excitations. Previously presented FIG. 1 illustrates such a comparison.

The electronic instructions to the machine tool to drive the first axis slide along the first axis using the first pattern of dynamic excitation commands and to drive the first axis slide along the first axis using the second pattern of dynamic excitation commands may be given in one instruction set at the start of the test. There may or may not be a pause between execution of the first pattern of dynamic excitation commands and the second pattern of dynamic excitation commands.

A further example of methods for assessing the dynamic performance of a machine tool for dynamic one axis positional accuracy of the machine tool is a method where the step of deriving a first quantification of a measurable merit of machine tool performance from the first machine-tool-response to the first pattern of dynamic excitation commands involves measuring a first actual motion of the first axis slide along the first motion axis in response to the first pattern of dynamic excitation commands, and then comparing the first actual motion with the first pattern of dynamic excitation commands to establish a first quantification of the dynamic one axis positional accuracy of the machine tool. In this further example the machine tool is further electronically instructed to drive the first axis slide along the first motion axis using a second pattern of dynamic excitation commands, where the second pattern is different from the first pattern of dynamic excitation commands. Then a second quantification of the measurable merit of machine tool performance is derived from the second pattern of dynamic excitation commands. Deriving the second quantification of the measurable merit of machine tool performance involves measuring a second actual motion of the first axis slide along the first motion axis in response to the second pattern of dynamic excitation commands, and comparing the second actual motion with the second pattern of dynamic excitation commands to establish a second quantification of the dynamic one axis positional accuracy of the machine tool.

Another important measurable merit of machine tool performance is error motions that are induced in one axis by the motion of one or more other axes. This is described as the dynamic cross-axis stability of the machine tool. If only one moveable element (e.g., the first slide 14 or the second slide 22 or the spindle 30) is electronically instructed to move in the setup of FIG. 3, there should be no displacement (i.e., a "null response") of the cubic reference block 100 with respect to the sensor nest 38 in the other orthogonal directions (the "cross-axes.") However, there often is some measurable displacement in the other orthogonal directions, especially under rapid displacement patterns of the movable element that is instructed to move. Quantifying such dynamic cross-axis stability is useful in understanding the accuracy of a machine tool. Similarly, different combinations of axes may be held stationary or deliberately moved to assess various cross-axis stability conditions.

In embodiments where a machine tool has a second axis slide having a second motion axis that is perpendicular to the first motion axis (such as the milling machine 10 of FIGS. 2 and 3) a measurable merit of machine tool performance is dynamic cross-axis stability of the machine tool. Quantifying dynamic cross-axis stability typically involves measuring a first actual motion of the second axis slide along the second motion axis in response to a first pattern of dynamic excitation commands given to the first axis, and then comparing the first actual motion with an expected null response along the second motion axis to establish a first quantification of the dynamic cross-axis stability of the machine tool.

Another dynamic cross-axis stability measurable merit of machine tool performance involves driving one axis with two patterns of dynamic excitation commands, and comparing the results. Presuming that the machine tool has a second motion axis, the machine tool is electronically instructed to drive the first axis slide along the first axis using a first pattern of dynamic excitation commands comprising displacements less than about one-half inch while measuring a first actual motion of the second axis slide along the second motion axis in response to the first pattern of dynamic excitation commands, and comparing the first actual motion with an expected null response along the second motion axis to establish a first quantification of the dynamic cross-axis stability of the machine tool. Then the machine tool is electronically instructed to drive the first axis slide along the first motion axis using a second pattern of dynamic excitation commands comprising displacements less than about one-half inch, where the second pattern being different from the first pattern of dynamic excitation commands. A second quantification of the measurable merit of machine tool performance is derived from the second pattern of dynamic excitation commands.

In a further embodiment the machine tool is electronically instructed to drive the first axis slide along the first axis using a first pattern of dynamic excitation commands using displacements less than about one-half inch while measuring a first actual motion of the second axis slide along the second motion axis in response to the first pattern of dynamic excitation commands, and comparing the first actual motion with an expected null response along the second motion axis to establish a first quantification of the dynamic cross-axis stability of the machine tool. Then a more detailed analysis of dynamic cross-axis stability may be made by electronically instructing the machine tool to drive the first axis slide along the first motion axis using a second pattern of dynamic excitation commands having displacements less than about one-half inch, where the second pattern is different from the first pattern of dynamic excitation commands. Further with this method, a second quantification of the measurable merit of machine tool performance is derived from the second pattern of dynamic excitation commands. This derivation includes measuring a second actual motion of the second axis slide along the second motion axis in response to the second pattern of dynamic excitation commands; and comparing the second actual motion with the expected null response on the second motion axis to establish a second quantification of the dynamic cross-axis stability of the machine tool.

Machine tool performance may also be evaluated by driving two motion axes in two patterns of dynamic excitation and measuring two-axis positional accuracy. This method typically involves the following steps:
  (a) electronically instructing the machine tool to drive the first axis slide along the first motion axis using a first pattern of dynamic excitation commands;
  (b) while performing step (a), electronically instructing the machine tool to drive the second axis slide in a second pattern of dynamic excitation commands along the second motion axis,
  (c) while performing steps (a) and (b), measuring a first actual motion of the first axis slide along the first motion axis,
  (d) while performing steps (a) and (b), measuring a second actual motion of the second axis slide along the second motion axis, and
  (e) evaluating the dynamic two axis positional accuracy of the machine tool by comparing (1) a first ideal relationship between the first pattern of dynamic excitation commands and the second pattern of dynamic excitation commands with (2) the first actual motion of the first axis slide along the first motion axis and the second actual motion of the second axis slide along the second motion axis.

It is important to note that in this embodiment the two patterns of dynamic excitation commands (steps (a) and (b)) may employ the same pattern executed simultaneously for two movable elements (e.g., the first axis slide and the second axis slide). Also, the measurements in steps (c) and (d) may be made in two distinct ways. In the first approach, both axes motions are measured and plotted against each other—for equal amplitude, in phase input commands, the response plot will be a straight line on a 45 degree angle if the two slides respond identically to the input. Deviations from the straight line define errors in the axes synchronization. A second approach is to use the same dynamic input commands but to also utilize a "bi-axis reference block" that allows the measurement of "out of plane errors." A "bi-axis reference block" is a block that has a face that is non-orthogonal to two of the motion axes of a machine tool. For example, for equal amplitude input commands, a 45 degree reference block may be used as the reference and a single position sensor used to measure the motion normal to the 45 degree surface as the two slides move along their motion axes. A bi-axis reference block is an example of a "reference block" as that term is used herein.

Figure 6:
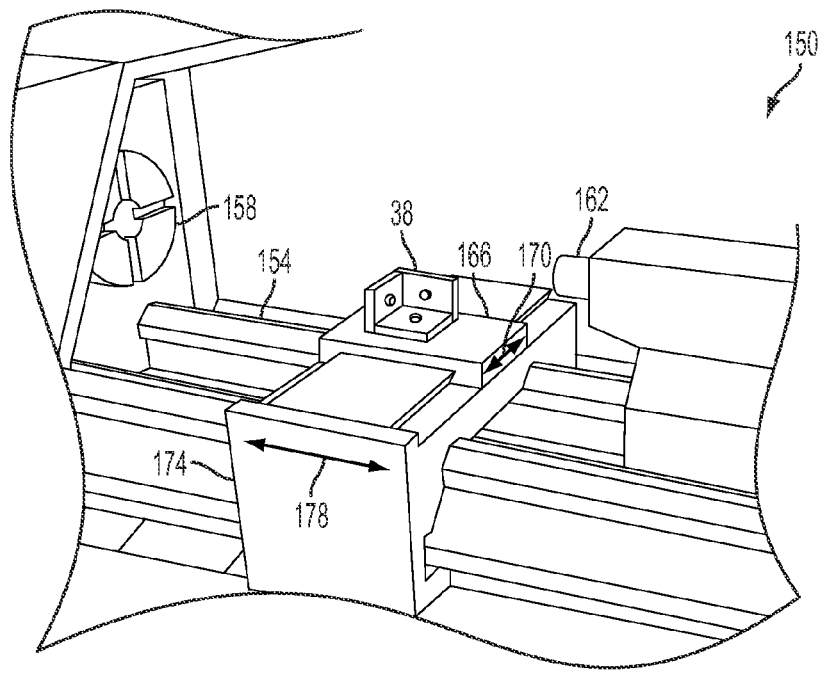
FIG. 6 is a perspective view of features of a lathe with a sensor nest installed.

Methods disclosed herein for assessing machine tool performance may be applied to other machine tools besides milling machines. For example, FIG. 6 illustrates a lathe 150 that has a stationary bed 154 and a spindle 158 and a tailstock 162. The lathe 150 also has a first slide 166 that moves along an X-axis 170 and a second slide 174 that moves along a Z-axis 178. The sensor nest 38 previously described with respect to installation on the three-axis milling machine 10 (FIGS. 2 and 3) is installed on the first slide 166.

Figure 7:
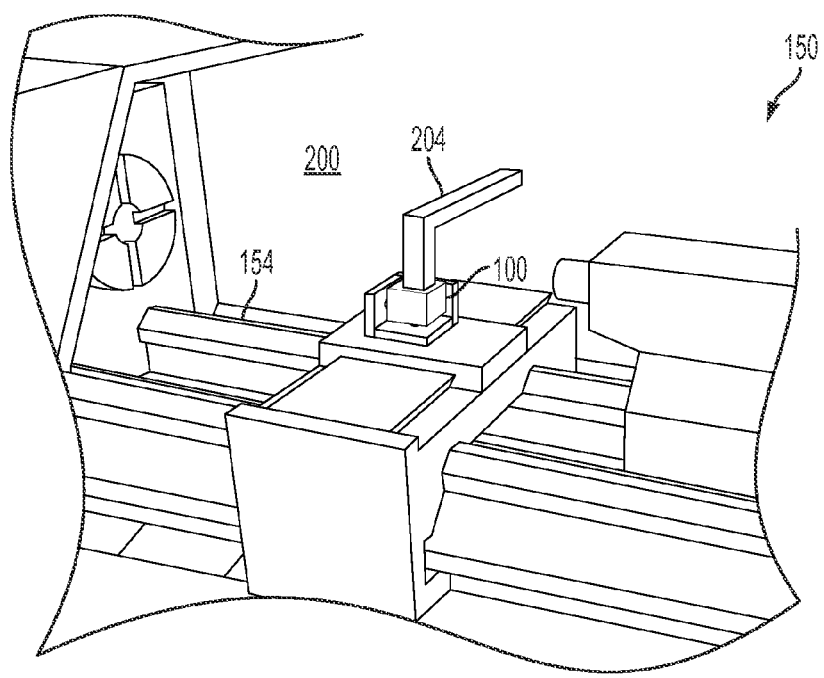
FIG. 7 is a perspective view of the lathe and sensor nest of FIG. 5, with a cubic reference block installed.

FIG. 7 illustrates how the cubic reference block 100 (previously described with respect to FIG. 3) may be installed for use with the sensor nest 38 on the lathe 150. For use with the lathe 150 the cubic reference block 100 is attached to a surface 200 by a mounting assembly 204. The surface 200 is secured to the bed 154 such that the surface 200 remains stationary, and the cubic reference block 100 remains stationary by virtue of the connection of the cubic reference block 100 to the surface 200. This configuration enables assessment of the dynamic performance of the lathe 150 using the methods described herein for a machine tool in general.

In some embodiments it is beneficial to predict the quality of parts that will be produced by a machine tool while using specific machining process parameters and/or machine set-up parameters. For example, the surface texture of a machined surface is a quality indicator that is typically characterized in terms of specific wavelengths of interest on the part surface, or characterized in terms of a maximum and a minimum surface profile wavelength. A good indication of the surface finish capability of a specific machine tool and workpiece may be predicted by electronically instructing the machine tool to drive the first axis slide along the first motion axis and to drive the second axis slide along the second motion axis using a first pattern of two-axis dynamic excitation commands while using the sensor nest and cubic reference block to monitor the respective slide motions. Then a first prediction of a first surface finish may be derived from the machine's response to the first pattern of two-axis dynamic excitation commands. That is, measured errors in the machine's response represent predictable patterns in a surface finish that will be produced by the machine. In reality, further defects in surface finish are introduced by such factors as cutting tool defects. Consequently, (except for the highly unlikely situation of compensating errors) the actual surface finish that the machine will achieve will be somewhat rougher than what is indicated by just the measured machine response errors. Further steps in predicting the surface finish capability of a machine tool may involve electronically instructing the machine tool to drive the first axis slide along the first motion axis and to drive the second axis slide along the second motion axis using a second pattern of two-axis dynamic excitation commands, such that a second prediction of surface texture is obtained or the machine performance is predicted when functioning with a second set of operating parameters by using the machine's response to the second pattern of two-axis dynamic excitation commands. In some embodiments the same set of dynamic excitation commands may be used with two or more sets of machining process parameters settings to determine the settings that provide the best performance for a specific task. As used herein the term "machining process parameters" refers to such variables as workpiece feed rate, tool feed rate, pause time for tool or workpiece settling, turning rotation rate, machine set-up parameters, and such modulated tool path parameters as oscillations (waves) per revolution (OPR), oscillation command frequency, and oscillation amplitude.

Figure 8:
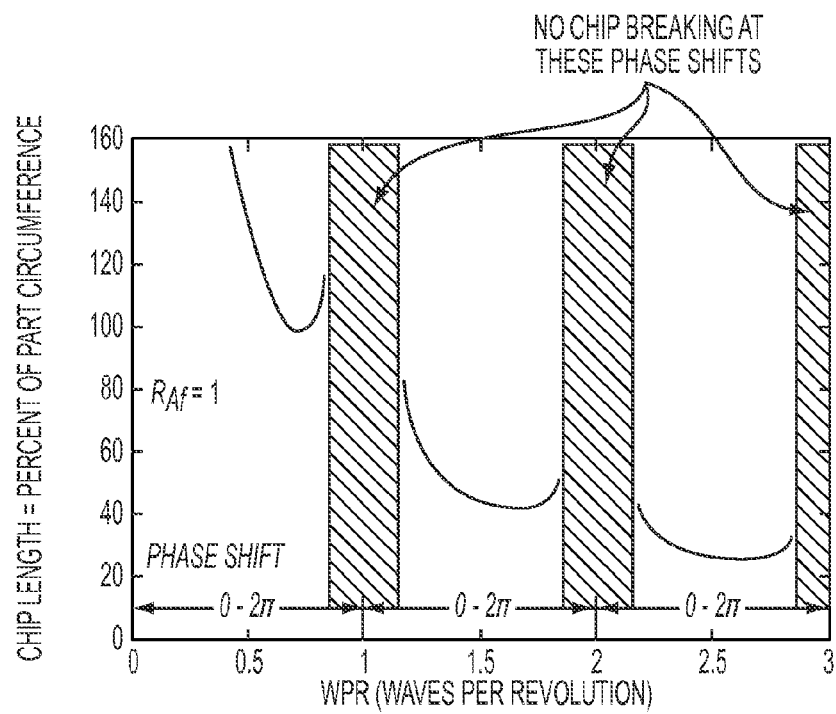
FIG. 8 is an illustration of a map of a machine tool functional performance that relates to the length of the chip that is formed during the machining operation.

When a lathe is used to turn a surface on a part made of a ductile material, the material is removed from the part in the form of chips. When turning parts on a lathe, it is generally desirable that the length of the chips be limited because long stringy chips tend to curl around the cutting tool and can damage the machine or the surface of the part being machined as well as present a hazard to the machine operator. Consequently lathes may be programmed with modulated cutting tool-paths in order to induce chip breaking. Errors in the dynamic accuracy of a lathe affect chip length. For a lathe (or other turning machine) that is being used in a modulated tool-path chip breaking mode of operation, the chip length control capability of the turning machine may be evaluated by electronically instructing the turning machine to drive the machine axes using a first pattern of dynamic excitation commands and deriving a first quantification of a chip length capability. Measured dynamic errors may be compared with the intended modulated tool path and an assessment of the impact on the chip length can be determined using a model, such as the one shown in FIG. 8, which relates chip length to a machine's ability to execute specific oscillation commands. Evaluating an ability of a lathe to generate chips of the desired length is an example of an evaluation of machine tool functional performance. To further evaluate the chip length control capability of the turning machine, the method typically involves electronically instructing the turning machine to drive the turning machine axes using additional patterns of dynamic excitation commands and deriving a full quantification of the machine's ability to control the chip length when using specific machining process parameters.

Figure 9:
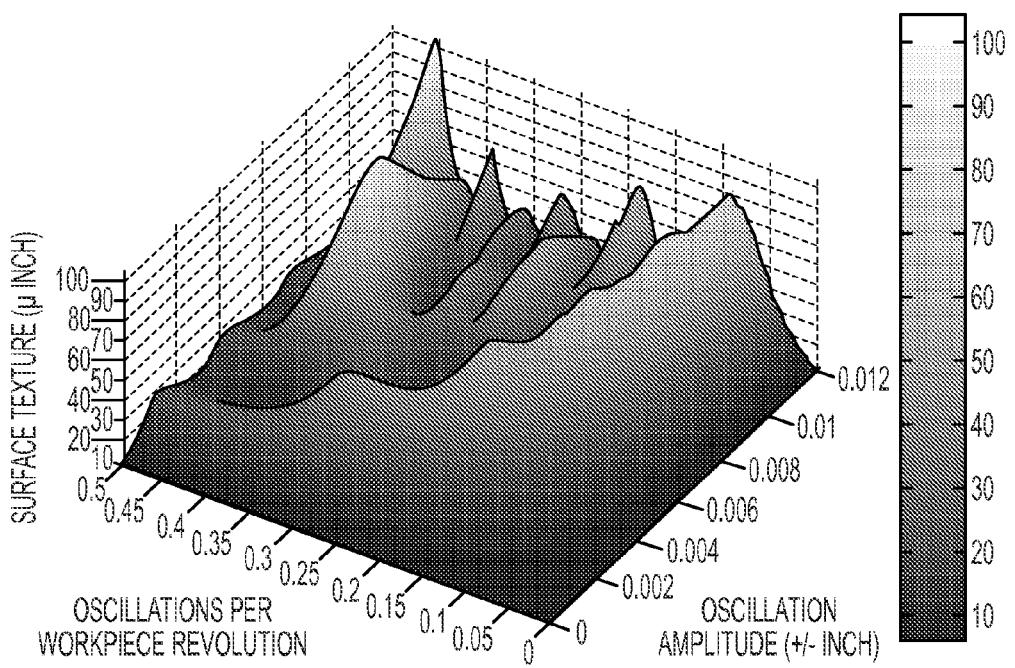
FIG. 9 is an illustration of a map of machine tool functional performance that relates to the surface texture of a workpiece.

FIG. 9 illustrates another example of an encoded map that may be used to evaluate machine tool functional performance. FIG. 9 predicts surface finish for a machine tool using the modulated tool-path chip breaking technique with combinations of various oscillations per revolution (OPR) and oscillation amplitudes. A particular surface texture may be generated by selecting various combinations of an OPR and an oscillation amplitude. In practice, a user may employ FIGS. 8 and 9 to determine the modulation parameters needed to deliver a particular chip length and surface finish. A further step may be to use dynamic machine characterization data, such as is shown in FIG. 1, to determine the ability of a particular machine tool to execute the necessary modulated tool-path commands. If a given machine is unable to perform the required dynamic motions, then it is necessary to modify the machining process parameters and/or the tool-path commands to achieve the needed result.

Figure 10:
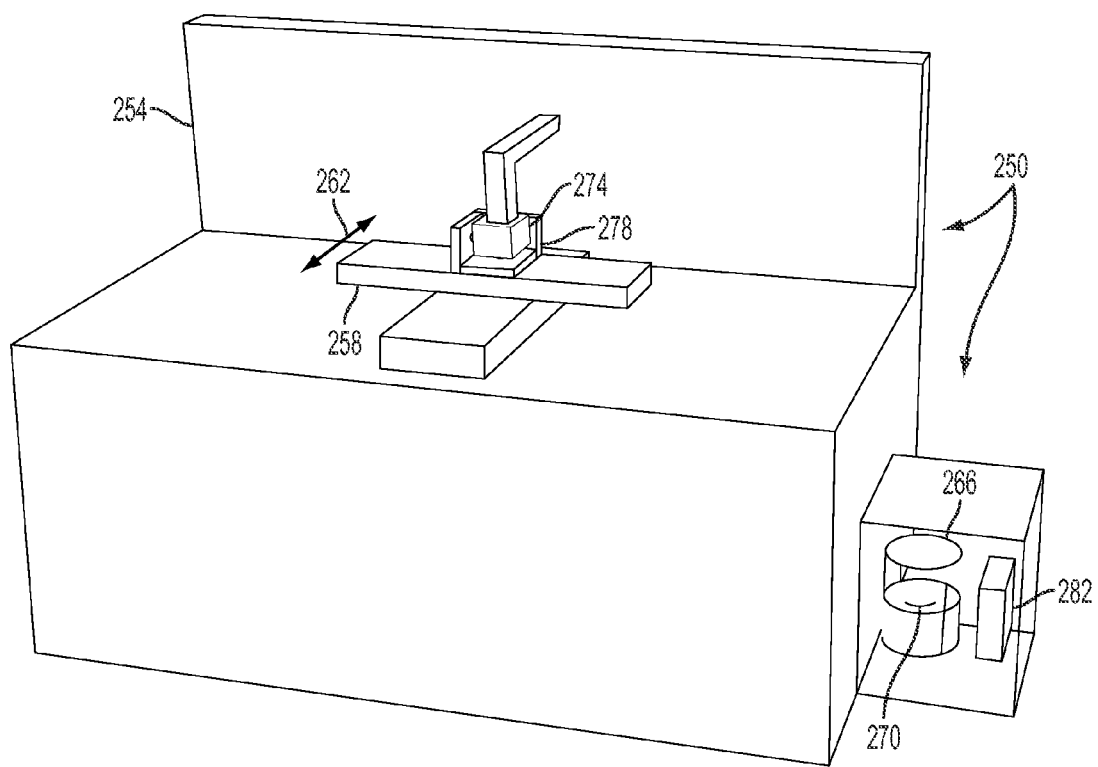
FIG. 10 is a somewhat schematic view of a machine tool and ancillary hardware.

FIG. 10 is a highly schematic illustration of a system 250 for assessing a capability of a machine tool 254. Only portions of the machine tool 254 are illustrated in the highly schematic illustration of FIG. 10. The machine tool 254 has a first axis slide 258 that moves along a first motion axis 262. The system 250 includes a hard drive 266. The hard drive 266 is an example of a data-processor-readable medium. Stored on the hard drive 266 are data-processor-readable instructions 270 for assessing a capability of a machine tool. The data-processor-readable instructions 270 include a definition of a measurable merit of machine tool performance and a definition of a first pattern of dynamic excitation commands representative of a first intended motion and definition of a second pattern of dynamic excitation commands representative of a second pattern of motion.

The system 250 also includes a reference block 274 and a sensor system 278 for measuring a relative motion between the sensor system 278 and the reference block 274. There is a data processor system 282. In some embodiments the data processor system 282 is embedded in the motion controller for the machine tool 254. The data processor system 282 includes subsystems for:
(a) reading the data-processor-readable instructions on the data-processor-readable medium;
(b) electronically instructing the machine tool to drive the first axis slide along the first motion axis using the first pattern of dynamic excitation commands and to drive the first axis slide along the first motion axis using the second pattern of dynamic excitation commands;
(c) deriving from the sensor system a first quantification of the measurable merit corresponding to the first pattern of dynamic excitation commands;
(d) deriving from the sensor system a second quantification of the measurable merit corresponding to the second pattern of dynamic excitation commands; and
(e) encoding a map of machine tool performance in the data-processor-readable medium, the map identifying the first quantification of the measurable merit of machine tool performance as a function of the first pattern of dynamic excitation commands and the map identifying the second quantification of the measurable merit of the machine tool performance as a function of the second pattern of dynamic excitation commands.

Some embodiments include a system for improving the performance of a machine tool. The system includes an encoded map (such as encoded map of FIG. 8 or FIG. 9) of machine tool performance stored in a data-processor-readable medium (such as the hard drive 266 of FIG. 10). An input device, such as a computer workstation is provided for accepting a machining job objective expressed as a function of at least a portion of at least one measurable merit of machine tool performance. There is a data processing system, such as the data processor system 282 of FIG. 10) that is provided for:
(f) receiving the machining job objective;
(g) reading at least a portion of the encoded map of machine tool performance;
(h) selecting an optimized pattern of dynamic excitation commands based at least in part upon the encoded map and the machining job objective; and
(i) providing the optimized pattern of dynamic excitation commands to a machine controller in the machine.

The optimized pattern of dynamic excitation commands may be used to perform sensor/block testing or may be used to enhance some aspect of machine performance quality such as surface finish or optimized chip breaking.

In summary, embodiments disclosed herein provide methods for assessing the dynamic performance of a machine tool that has at least one driven axis using at least one pattern of dynamic excitation commands. Various measurable merits of machine tool performance may be derived, such as positional accuracy, cross-axis error, surface finish, and chip length.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method for assessing a dynamic performance of a machine tool having a first axis slide that has a first motion axis, comprising:
   (a) electronically instructing the machine tool configured for machining a workpiece without rotation of the workpiece to drive the first axis slide along the first axis using a first pattern of dynamic excitation commands comprising displacements less than about one-half inch to generate a first machine-tool-response;
   (b) deriving a first quantification of a measurable merit of machine tool performance from the first machine-tool-response to the first pattern of dynamic excitation commands;
   (c) electronically instructing the machine tool to drive the first axis slide along the first motion axis using a second pattern of dynamic excitation commands comprising displacements less than about one-half inch, the second pattern being different from the first pattern of dynamic excitation commands to generate a second machine-tool-response; and
   (d) deriving a second quantification of the measurable merit of machine tool performance from the second machine-tool-response to the second pattern of dynamic excitation commands.

2. The method of claim 1 wherein the measurable merit of machine tool performance comprises dynamic one axis positional accuracy of the machine tool, and wherein:
   step (b) comprises
   (i) measuring a first actual motion of the first axis slide along the first motion axis in response to the first pattern of dynamic excitation commands, and
   (ii) comparing the first actual motion with the first pattern of dynamic excitation commands to establish a first quantification of the dynamic one axis positional accuracy of the machine tool.

3. The method of claim 2 wherein the measurable merit of machine tool performance comprises dynamic one axis positional accuracy of the machine tool and wherein step (d) comprises:
   (i) measuring a second actual motion of the first axis slide along the first motion axis in response to the second pattern of dynamic excitation commands, and
   (ii) comparing the second actual motion with the second pattern of dynamic excitation commands to establish a second quantification of the dynamic one axis positional accuracy of the machine tool.

4. A method for assessing a dynamic multi-axis positional accuracy of a machine tool having a first axis slide having a first motion axis and having a second axis slide having a second motion axis that is perpendicular to the first motion axis, comprising:
   (a) electronically instructing the machine tool to drive the first axis slide along the first motion axis using a first pattern of dynamic excitation commands;
   (b) while performing step (a), electronically instructing the machine tool to drive the second axis slide in a second pattern of dynamic excitation commands along the second motion axis,
   (c) while performing steps (a) and (b), measuring a first actual motion of the first axis slide along the first motion axis,
   (d) while performing steps (a) and (b), measuring a second actual motion of the second axis slide along the second motion axis,
   (e) evaluating the dynamic multi-axis positional accuracy of the machine tool by comparing (1) a first ideal relationship between the first pattern of dynamic excitation commands and the second pattern of dynamic excitation commands with (2) the first actual motion of the first axis slide along the first motion axis and the second actual motion of the second axis slide along the second motion axis.

5. A method for assessing a dynamic performance of a machine tool having a first axis slide that has a first motion axis and a second axis slide having a second motion axis that is perpendicular to the first motion axis, comprising:
   (a) electronically instructing the machine tool to drive the first axis slide along the first axis using a first pattern of dynamic excitation commands comprising displacements less than about one-half inch to generate a first machine-tool-response;
   (b) deriving from the first machine-tool-response a first quantification of a measurable merit of machine tool performance indicating dynamic cross-axis stability of the machine tool comprising:
   (i) measuring a first actual motion of the second axis slide along the second motion axis in response to the first pattern of dynamic excitation commands, and
   (ii) comparing the first actual motion with an expected null response along the second motion axis to establish a first quantification of the dynamic cross-axis stability of the machine tool.

6. The method of claim 5 wherein the machine tool is configured for machining a workpiece without rotation of the workpiece.

7. A method for assessing a dynamic performance of a machine tool having a first axis slide that has a first motion axis and a second axis slide having a second motion axis that is perpendicular to the first motion axis, comprising:
   (a) electronically instructing the machine tool to drive the first axis slide along the first axis using a first pattern of dynamic excitation commands comprising displacements less than about one-half inch to generate a first machine-tool-response;
   (b) deriving from the first machine-tool-response a first quantification of a measurable merit of machine tool performance indicating dynamic cross-axis stability of the machine tool comprising:
   (i) measuring a first actual motion of the second axis slide along the second motion axis in response to the first pattern of dynamic excitation commands,
   (ii) comparing the first actual motion with an expected null response along the second motion axis to establish a first quantification of the dynamic cross-axis stability of the machine tool;
   (c) electronically instructing the machine tool to drive the first axis slide along the first motion axis using a second pattern of dynamic excitation commands comprising displacements less than about one-half inch, the second pattern being different from the first pattern of dynamic excitation commands; and
   (d) deriving a second quantification of the measurable merit of machine tool performance indicating dynamic cross-axis stability of the machine tool from the second pattern of dynamic excitation commands.

8. The method of claim 7 wherein the machine tool is configured for machining a workpiece without rotation of the workpiece.

\* \* \* \* \*